United States Patent [19]

Hung et al.

[11] Patent Number: 4,936,642

[45] Date of Patent: Jun. 26, 1990

[54] METHOD OF CONSTRUCTING A HOLOGRAM WHOSE THICKNESS IS INDEPENDENT OF THE THICKNESS OF THE HOLOGRAPHIC RECORDING MATERIAL

[75] Inventors: Jen-Lih Hung, Beaverton; Robert B. Wood, Hillsboro, both of Oreg.

[73] Assignee: Flight Dynamics, Inc., Portland, Oreg.

[21] Appl. No.: 788,073

[22] Filed: Oct. 16, 1985

[51] Int. Cl.$^5$ ............................................. G03H 1/04
[52] U.S. Cl. .................................... 350/3.81; 350/3.83
[58] Field of Search ....................... 350/3.6, 3.7, 3.72, 350/3.73, 3.81, 3.83, 3.67, 3.69

[56] References Cited

U.S. PATENT DOCUMENTS

| | | | |
|---|---|---|---|
| 3,677,616 | 7/1972 | Lewis | 350/3.81 |
| 4,456,328 | 6/1984 | Arns et al. | 350/3.6 |
| 4,458,977 | 7/1984 | Arns et al. | 350/3.6 |
| 4,458,978 | 7/1984 | Arns et al. | 350/3.67 |
| 4,582,389 | 4/1986 | Wood et al. | 350/3.69 |

FOREIGN PATENT DOCUMENTS

2071866A 9/1981 United Kingdom .

OTHER PUBLICATIONS

"Laserless Viewer Reconstructs Holograms Without Speckle," *Optical Spectra*, vol. 4, No. 9, Oct., 1970, p. 39.

Koreshev, S. N., "Making Holographic Mirrors in Spatially Incoherent Light," *Opt. Spectrosc.* (USSR), 61(1), Jul. 1986, pp. 87–89.

Swanson, G. J., "Interferometric Recording of High-Quality Zone Plates in Spatially Incoherent Illumination", *Optics Letters*, vol. 8, No. 1, Jan. 1983, pp. 45–47.

E. N. Leith, G. Swanson, S. Leon, "Construction of Diffractive Optical Elements in Non-Coherent Light," SPIE *Application, Theory, and Fabrication of Periodic Structures*, vol. 503, 1984, pp. 2–8.

*Primary Examiner*—Bruce Y. Arnold
*Assistant Examiner*—Martin Lerner
*Attorney, Agent, or Firm*—Stoel Rives Boley Jones & Grey

[57] ABSTRACT

A method of constructing flare-free reflection holograms uses a light scattering mechanism positioned between a first exposure beam and holographic recording material to remove the spatial coherence from all but adjacent rays within a relatively small angular range before the light rays of the first exposure beam strike the hologram surface. A second exposure beam of spatially coherent light rays interferes with mutually spatially coherent light rays of the first exposure beam to form a primary hologram. Light rays reflected off the holographic recording material noncontacting surface of the substrate interfere with the light rays of the first exposure beam but do not form parasitic hologram recordings because the interfering light rays are not mutually spatially coherent. The size of the region on the scattering device illuminated by the first exposure beam can also be selectively adjusted to determine the angular range of spatial coherence of the exposure beam and thereby create a primary hologram whose thickness is independent of and, if desired, may be made less than the thickness of the holographic recording material.

8 Claims, 2 Drawing Sheets

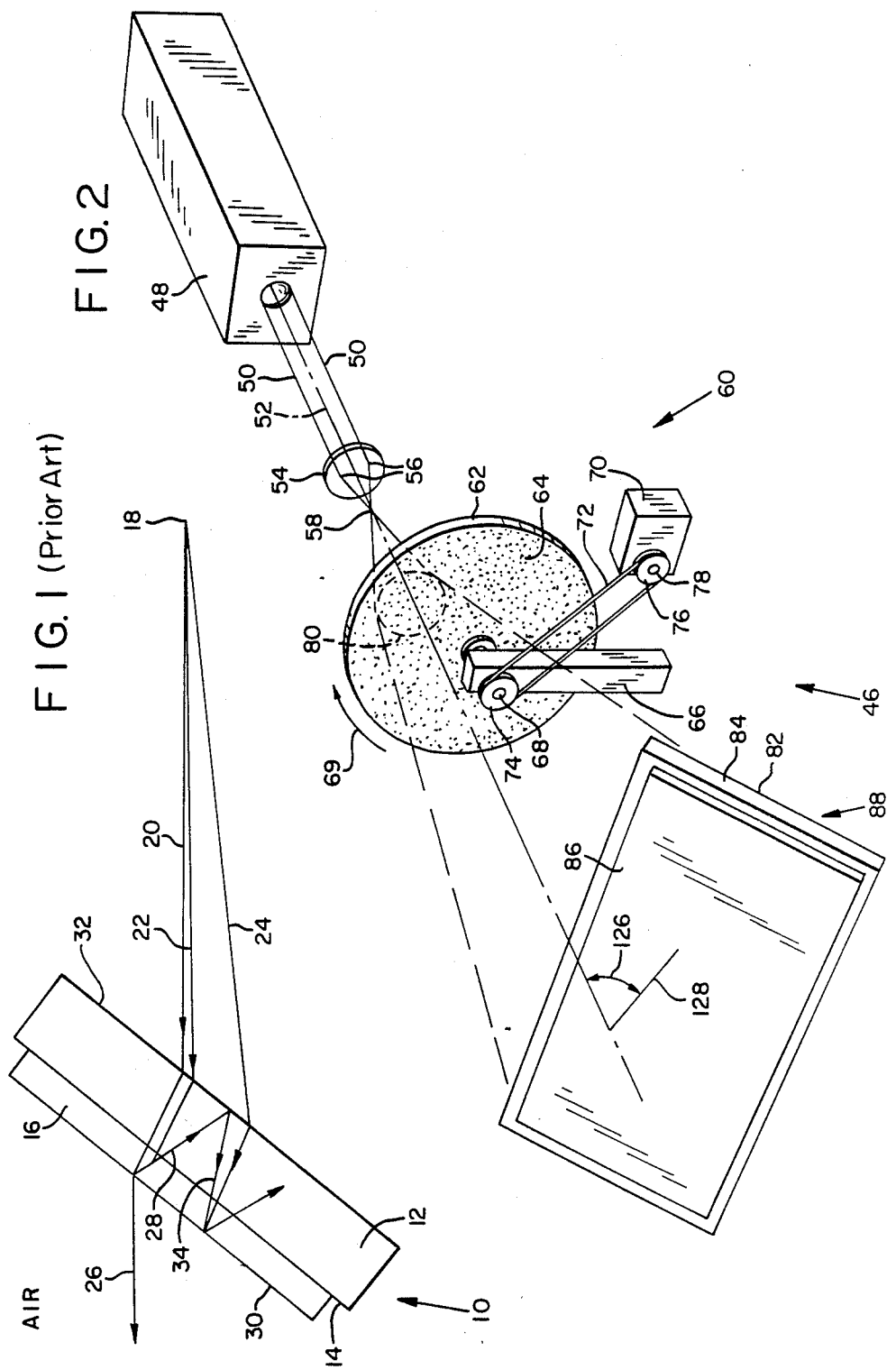

METHOD OF CONSTRUCTING A HOLOGRAM WHOSE THICKNESS IS INDEPENDENT OF THE THICKNESS OF THE HOLOGRAPHIC RECORDING MATERIAL

BACKGROUND OF THE INVENTION

The present invention relates to construction techniques for reflection holograms, and in particular, an apparatus and a method for constructing reflection holograms of selectable equivalent thickness that are free from the effects of parasitic holograms that cause multiple images to appear in optical display systems incorporating them.

It is known that during reflection hologram construction, flare-causing parasitic transmission holograms develop as a consequence of multiple reflections of light energy in the hologram recording apparatus from the surfaces which form interfaces of materials of different indices of refraction. The reflected light energy interacts with the construction light rays to form the parasitic holograms. Solutions for suppressing the formation of parasitic holograms in diffusion holograms, reflection holograms with a single beam exposure system, and reflection holograms with a double beam exposure system are described in the respective U.S. Pat. Nos. 4,456,328; 4,458,977; and 4,458,978 of Arns et al., all of which are assigned to Hughes Aircraft Company. Only U.S. Pat. No. 4,458,977 ('977 patent) merits discussion.

The '977 patent describes a hologram recording structure that includes a single point source from which a first construction beam of light rays emanates and passes through a holographic recording material applied on a curved surface. More specifically, the light rays pass through a cover plate, a first index matching fluid layer, the recording material, a second index matching fluid layer, and then reflect from a curved mirror to form a second construction beam of light rays that interfere with the incident first construction beam of light rays to form the hologram. The recording structure has a mechanism which moves the mirror and the recording material together with respect to the cover plate to continuously change the phase of undesired light energy reflected from the cover plate and thereby prevent the formation of spurious holograms.

In FIG. 5, and column 7, lines 45–53, the '977 patent describes the use of a global phase shifter that is positioned between the point source and the cover plate. The global phase shifter corrects the phase of the first construction beam to maintain a constant phase for each of its light rays so that at any point on the recording material the first and second construction beams maintain their relative phase relationship.

The recording structure of the '977 patent suffers from the disadvantage of requiring a very complicated mechanism for changing the phases of the reflected light energy relative to the construction beams to prevent the formation of spurious holograms. Moreover, the '977 patent does not contemplate the effect of the position of the source and the mirror in forming a pattern of holographic isoindex fringe surfaces that intersect the surface of the substrate, thereby creating a weak transmission grating effect, which is another source of flare.

A technique for reducing flare resulting from the transmission grating effect is disclosed in U.S. Pat. No. 4,582,389 of Robert B. Wood and Robert F. Cannata, for "Holographic Device." The method of making the hologram described in the '977 patent is incompatible for use with the technique described in the patent of Wood et al. because one of the reflected light ray components which the '977 patent seeks to suppress is that upon which the patent of Wood et al. relies to form the primary hologram.

U.K. Patent Application GB 2 071 866 A of The Marconi Company Limited describes a method of making a holographic reflector. The method includes the steps of directing a laser beam toward a photosensitive film and repeatedly illuminating on the film adjacent beam spots of a very small area as compared with the total area of the film. A mirror positioned adjacent to the film reflects the laser beam to provide a second construction beam. The laser beam is moved relative to the film so that each point on the film is illuminated numerous times so that the total illumination received by each point is substantially constant. The beam is scanned systematically over the surface of the film in a sequence of line scans with adjacent line scans being spaced apart by a distance that is small compared with any dimension of the beam spot on the film.

Exposing the photographic film in this manner would apparently prevent the formation of parasitic holograms because the reflected light energy would not interfere with the light rays of the construction beams which illuminate a very small area on the photographic film at any given instant during exposure. The recording method of The Marconi Company suffers from the disadvantage of requiring an exposure time for each spot on the photographic film of about 10 seconds. The total time required to complete construction of the hologram would be, therefore, prohibitively long.

SUMMARY OF THE INVENTION

An object of the present invention is, therefore, to provide a method of constructing reflection holograms that are free from flare-causing parasitic holograms.

Another object of this invention is to provide an apparatus for carrying out such a method which apparatus is of relatively simple mechanical design and is capable of exposing the entire surface of the holographic recording material at once.

A further object of this invention is to provide an apparatus for carrying out such a method which apparatus is compatible with the implementation of other techniques for suppressing flare that results from other sources during construction of a reflection hologram.

Yet another object of this invention is to provide a method of constructing a reflection hologram that is free from parasitic transmission hologram recordings and whose thickness is independent of and may be made less than the thickness of the holographic recording material.

Additional objects and advantages of the present invention will be apparent from the following detailed description of a preferred embodiment thereof which proceeds with reference to the accompanying drawings.

BRIEF DESCRIPTION OF THE DRAWINGS

FIG. 1 is a schematic diagram showing the origin of reflected light energy that interferes with the light rays of a construction beam to form parasitic transmission hologram recordings.

FIG. 2 is a schematic isometric view of apparatus for constructing flare-free reflection holograms in accordance with the present invention.

DETAILED DESCRIPTION OF A PREFERRED EMBODIMENT

Figure 3:
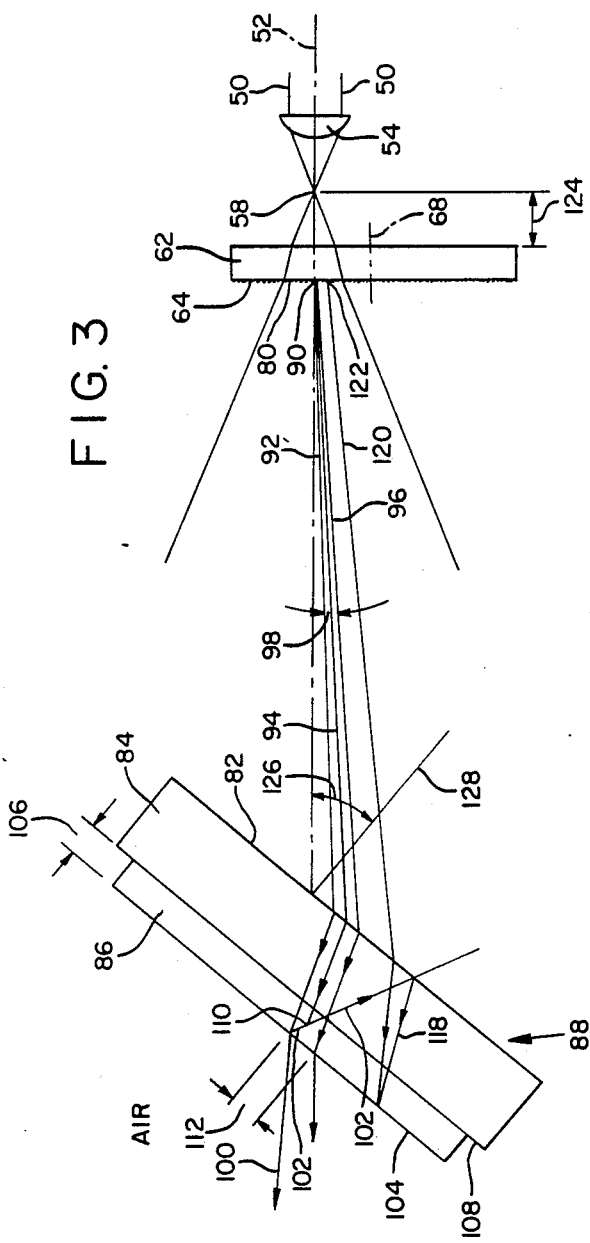
FIG. 3 is a schematic diagram showing for a single instant in time the construction geometry that suppresses parasitic hologram recordings during exposure of a reflection hologram in accordance with the present invention.

FIG. 1 shows the construction geometry for a reflection hologram 10 that can be incorporated in an optical display system, such as, for example, a head-up display system for aircraft. FIG. 1 demonstrates the origin of reflected light energy that interacts with a construction beam to form parasitic hologram recordings in the absence of the apparatus of the present invention.

With reference to FIG. 1, reflection hologram 10 comprises a transparent substrate 12, such as glass, on whose surface 14 is applied an 18 micron thick layer of holographic recording material 16 (shown in enlarged scale), such as dichromated gelatin. The thickness of substrate 12 is about 0.3 cm.

Holographic recording material 16 is illuminated by a laser point source 18 having a wavelength of typically 515 nanometers. Hologram 10 is formed from light rays emanating from a single point source in accordance with the technique described in the above-identified patent of Wood et al. During exposure, three exemplary light rays 20, 22, and 24 emanate from point source 18 and pass through and undergo refraction by substrate 12. Light ray 20 separates into a major transmission component 26 and a minor reflection component 28 of, respectively, relatively high and low light intensities at the substrate noncontacting surface 30 of holographic recording material 16. (For purposes of clarity, the major and minor components of light rays 22 and 24 are omitted from FIG. 1.) This is the result of the difference between the index of refraction of air and the index of refraction of the gelatin at the air-gelatin interface at surface 30. The reflected light component 28 propagates back through recording material 16 and interacts with light ray 22 emanating from point source 18 to form in hologram 10 an isoindex fringe surface which is essentially parallel to, i.e., does not intersect surface 14 of, substrate 12. A fringe surface of this character provides a negligible transmission grating effect which would otherwise introduce flare into a scene viewed through the hologram.

Major component 26 exits recording material 16 and passes unused through the air. Minor component 28 passes through recording material 16 and across surface 14 to holographic recording material noncontacting surface 32 of substrate 12. A light ray component 34 reflects off surface 32 of and back through substrate 12. The reflection of light ray component 34 is the result of the presence of an imperfect anti-reflection coating applied on surface 32. To suppress this reflection, surface 32 could be coated with an anti-reflection coating that is optimized for the exposure wavelength of the laser, but the anti-reflection coating would not be optimized for the playback wavelength, which typically differs from the exposure wavelength. Such an anti-reflection coating would also cause, therefore, surface reflection of light rays of sufficient energy to record a parasitic transmission hologram as described below.

Light ray component 34 propagates through recording material 16 and interacts with light ray 24 to form a parasitic transmission holographic recording which is a source of flare when a scene is viewed through the resultant reflection hologram 10.

FIG. 2 is a schematic diagram of the apparatus of the present invention for constructing a reflection hologram and suppressing the formation of parasitic transmission hologram recordings. With reference to FIG. 2, reflection hologram construction apparatus 46 comprises a laser source 48 which emits a first exposure beam of spatially and temporally coherent parallel light rays 50. Light rays 50 propagate along a beam path 52 and strike a plano-convex lens 54 which develops a converging spherical wavefront of light rays. Lens 54 is of the same design as a microscope objective and functions as a substitute for a conventional spatial filter of the pinhole type.

It is generally necessary to use a noise-free light source to construct a high quality hologram. A noise-free light source is typically achieved by carefully aligning a pinhole spatial filter with the propagation path of light emanating from the light source in order to prevent the production of light energy of high spatial frequency content. The present invention uses a diffusing plate that renders the use of a spatial filter unnecessary by providing a uniform light energy distribution at the plane of the hologram which is under construction.

The light rays 56 exiting lens 54 converge to a focal point 58 and diverge from one another as they propagate toward a rotatable scatter plate mechanism 60 which functions as a means to reduce the spatial coherence of light rays incident to it. Laser 48 and lens 54 cooperate to form a point source of light rays 56 emanating from focal point 58.

Scatter plate mechanism 60 comprises a diffusing plate or disk 62 which is constructed of a transparent material, such as glass, of which one surface 64 is conditioned to diffuse light rays transmitted through it. Fine grinding and sandblasting one side of a glass disk are two techniques for achieving a suitable ground surface for use in accordance with the present invention. Diffusing disk 62 is mounted to one end of a support stand 66 and is journalled for rotation about the center 68 of the disk. Diffusing disk 62 rotates in a transverse direction 69 of beam path 52. A motor 70 rotates diffusing disk 62 by means of an endless belt 72 which interconnects two pulleys 74 and 76, which are mounted to, respectively, diffusing disk 62 at its center 68 and motor 70 on its output shaft 78. Rotation of diffusing disk 62 removes speckle or fixed pattern noise from the optical system during exposure.

The generally circular region 80 appearing on ground surface 64 of diffusing disk 62 represents the area in space illuminated by the diverging spherical wavefront of light rays 56 incident to it. The light rays 58 propagating through diffusing disk 62 and exiting surface 64 are no longer spatially coherent, except for those proximal to each other over a very small angle at any given point on surface 64, as will be described below. It will be appreciated that the light rays passing through region 80 expose at once the entire surface 82 of a transparent substrate 84 on which a holographic recording material 86 is applied to construct a reflection hologram 88. Substrate 84 and holographic recording material 86 are constructed of the same materials and have the same dimensions as substrate 12 and holographic recording material 16, respectively.

FIG. 3 is a diagram showing for an instant in time the formation of a primary holographic recording at one exemplary region and the suppression of a parasitic hologram recording in reflection hologram 88. With reference to FIG. 3, a point 90 on ground surface 64 of rotating diffusing disk 62 represents an exemplary scatter point that functions equivalently as a point source of spatially coherent light rays 92, 94, and 96 over a very small angle 98. Scatter point 90 is located near the principal axis of lens 54, which coincides with beam path 52. The slope of the rough surface at scatter point 90 causes beams 92, 94, and 96 to diverge slightly over angle 98 and thereby expose a very small region of recording material 86, depending on the distance from recording material 86 to scatter point 90. Light rays propagating from an adjacent scatter point would not be spatially coherent to light rays 92, 94, and 96 at a given instant in time because of the discontinuities present in ground surface 64.

Light ray 92 emanates from scatter point 90 and passes through and undergoes refraction at surface 82 of substrate 84. Light ray 92 separates into a major transmission component 100 and a minor reflection component 102 of, respectively, relatively high and low light intensities at the substrate noncontacting surface 104 of the gelatin recording material 86 in the manner described above with reference to FIG. 1. Light ray 96, which also emanates from scatter point 90 and is angularly displaced slightly relative to light ray 92, passes through and undergoes refraction by glass substrate 84 and interferes with reflection component 102 throughout the entire thickness 106 of recording material 86. Light ray 94 emanates from scatter point 90 within the region defined by angle 98 and passes through and undergoes refraction by glass substrate 84. Light ray 96 intersects reflection component 102 at an isoindex fringe surface 110 within recording material 86. It is apparent, therefore, that the spatially coherent light rays included within angle 98 subtend a hologram recording region of a width 112 that is defined by the propagation paths of light rays 92 and 96 within recording material 86. This region subtended by angle 98 is about 15 arc-seconds.

As indicated above, the production of reflection component 102 results from the difference between the indices refraction of air and the gelatin at surface 104 of recording material 86. Reflection component 102 propagates through recording material 86 and substrate 84 and strikes surface 82. Since the anti-reflection coating on surface 82 is imperfect, a reflected light ray component 118 reflects back through substrate 84 into recording material 86. A light ray 120 emanating from a different scatter point 122 on ground surface 64 of diffusing disk 62 passes through substrate 84 and intersects the path of reflected light ray 118 in recording material 86. Since light ray 120 emanated from a different scatter point, there exists no spatial coherence between light rays 118 and 120 that can promote the formation of a parasitic hologram recording.

It will be appreciated that for any instant during exposure, the above-described analysis can be applied for any point within region 80 on ground surface 64 of diffusing disk 62 to expose the entire surface of recording material 86 at once without the formation of parasitic hologram recordings. Region 80 defines, therefore, an area on ground surface 64 that includes plural point sources of spatially noncoherent light. Each point source emits, however, mutually spatially coherent light rays over a relatively small angle. For each light ray of the first exposure beam that strikes the air-gelatin interface 104, a mutually spatially coherent light ray of the second exposure beam develops to form the reflection hologram.

Since diffusing disk 62 is rotating, light rays emanating from other scatter points on ground surface 64 do not appear in a region where mutually spatially coherent light rays can be found to form a parasitic transmission hologram. In other words, although it may appear in a given region within recording material 86, a light ray emanating from a different scatter point in region 80 would not be mutually spatially coherent with the light ray in that region and, as a consequence, would not form a parasitic transmission hologram. The method of the present invention is, therefore, to remove the spatial coherence of all but adjacent rays of the light rays within a very small angle of the first exposing wavefront before they strike the holographic recording material.

It will be appreciated that there exists a relationship as respects the distance 124 between focal point 58 and diffusing disk 62. Whenever distance 124 increases, a decrease in the size of angle 98 and a corresponding decrease in depth of exposure in recording material 86 result, thereby simulating a thin holographic recording material. Whenever the size of angle 98 decreases, a consequent decrease in width 112 of the region of coherent light rays also results. Selecting distance 124 between focal point 58 and diffusing disk 64 has, therefore, the effect of creating a hologram of the desired thickness but which is insensitive to the actual thickness of holographic recording material 86 applied on the surface of substrate 84.

Hologram 88 is shown downwardly inclined in FIGS. 2 and 3 at an angle 126 with respect to beam path 52 and a surface normal 128 to demonstrate that rotatable scatter plate mechanism 60 is operable to produce a reflection hologram 88 that is free from parasitic transmission hologram recordings, irrespective of the angle of incidence of the light rays emanating from the point source. The combination of the method of present invention for suppressing parasitic hologram recordings with the method of deriving the second exposure wavefront by reflection at the air-gelatin interface permits, therefore, the formation of a reflection hologram of flare-free character.

It will be obvious to those having skill in the art that many changes may be made in the above-described details of the preferred embodiment of the present invention without departing from the underlying principles thereof. For example, the substrate on which the holographic recording material is applied can be curved. A reflection hologram of this type can be made to have optical power that is provided by the curvature of the substrate or by the shape of the holographic fringes. It will be appreciated, however, that introducing optical power into the hologram is a source of flare that stems from the transmission grating effect. The scope of the present invention, therefore, should be determined only by the following claims.

What is claimed is:

1. A method of constructing a hologram of selectable equivalent thickness, comprising:
   applying holographic recording material of a predetermined thickness on a surface of a substrate;
   exposing the holographic recording material to generally spherical first ave fronts of light that propagate along a path and emanate from a focal point of light positioned at distance from the substrate;

positioning a diffusing element within the path and between the focal point and the substrate to illuminate a region of the diffusing element with the generally spherical first wavefronts of light;

developing second wavefronts of light to interfere with the generally spherical first wavefronts of light to construct a hologram; and selecting the size of the illuminated region of the diffusing element to determine the depth of holographic fringe surface pattern exposure in the holographic recording material and thereby construct a hologram whose fringe surface pattern is of a thickness that is independent of the predetermined thickness of the holographic recording material.

2. The method of claim 1 in which the size of the illuminated region of the diffusing element is selected by changing the distance between the focal point and the diffusing element.

3. The method of claim 1 in which the recording material has a substrate noncontacting surface of a first refractive index, the substrate noncontacting surface defining an interface between the recording material and a medium of a second refractive index, and the second wavefronts of light rays are developed by reflection at the interface as the generally spherical first wavefronts of light propagate across the interface.

4. The method of claim 3 in which the medium of the second refractive index is air.

5. A hologram constructed in accordance with the method of claim 1.

6. The method of claim 1 in which the thickness of the fringe surface pattern is less than the predetermined thickness of the holographic recording material.

7. The method of claim 1 in which the diffusing element moves in a transverse direction of the path of the first wavefronts of light during exposure of the first holographic recording material.

8. The method of claim 7 in which the diffusing element includes transparent material having a ground surface.

* * * * *

UNITED STATES PATENT AND TRADEMARK OFFICE
CERTIFICATE OF CORRECTION

PATENT NO. : 4,936,642

DATED : June 26, 1990

INVENTOR(S) : Jen-Lih Hung and Robert B. Wood

It is certified that error appears in the above-identified patent and that said Letters Patent is hereby corrected as shown below:

Column 1, line 67, after "Cannata" delete ",".

Claim 1, column 6, line 68, change "ave fronts" to --wavefronts--.

Claim 1, column 7, line 2, after "at" insert --a--.

Signed and Sealed this

Twelfth Day of November, 1991

Attest:

HARRY F. MANBECK, JR.

*Attesting Officer*   *Commissioner of Patents and Trademarks*